US010444871B2

(12) United States Patent
Wang

(10) Patent No.: US 10,444,871 B2
(45) Date of Patent: Oct. 15, 2019

(54) INFORMATION PROCESSING METHOD, TERMINAL, AND COMPUTER STORAGE MEDIUM

(71) Applicant: TENCENT TECHNOLOGY (SHENZHEN) COMPANY LIMITED, Shenzhen (CN)

(72) Inventor: Haosu Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 82 days.

(21) Appl. No.: 15/720,432

(22) Filed: Sep. 29, 2017

(65) Prior Publication Data

US 2018/0024660 A1 Jan. 25, 2018

Related U.S. Application Data

(63) Continuation of application No. PCT/CN2016/083208, filed on May 24, 2016.

(30) Foreign Application Priority Data

Oct. 10, 2015 (CN) .......................... 2015 1 0654167

(51) Int. Cl.
G06F 3/0354 (2013.01)
G06F 3/0484 (2013.01)
(Continued)

(52) U.S. Cl.
CPC ...... *G06F 3/03547* (2013.01); *A63F 13/2145* (2014.09); *A63F 13/25* (2014.09);
(Continued)

(58) Field of Classification Search
None
See application file for complete search history.

(56) References Cited

U.S. PATENT DOCUMENTS 6,587,131 B1 7/2003 Nakai et al.
2007/0064004 A1 3/2007 Bonner et al.
(Continued)

FOREIGN PATENT DOCUMENTS

CN 103809888 A 5/2014
CN 104076986 A 10/2014
(Continued)

OTHER PUBLICATIONS

The World Intellectual Property Organization (WIPO) International Search Report for PCT/CN2016/083208 Jul. 28, 2016 5 Pages. (including translation).

(Continued)

*Primary Examiner* — Ronald Laneau
(74) *Attorney, Agent, or Firm* — Anova Law Group, PLLC

(57) ABSTRACT

An information processing method includes: performing rendering on a graphical user interface to obtain at least one virtual resource object; when detecting a skill-release trigger gesture on at least one skill object, performing rendering to obtain a skill-release supplementary control object, having a skill-release control halo object and a virtual joystick object; when detecting a dragging operation on the virtual joystick object, controlling a skill-release location of the skill object to be correspondingly adjusted; and determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object.

17 Claims, 9 Drawing Sheets

(51) Int. Cl.
*A63F 13/25* (2014.01)
*G06F 3/0481* (2013.01)
*G06F 3/0488* (2013.01)
*A63F 13/42* (2014.01)
*A63F 13/426* (2014.01)
*A63F 13/2145* (2014.01)

(52) U.S. Cl.
CPC ............ *A63F 13/42* (2014.09); *A63F 13/426* (2014.09); *G06F 3/0484* (2013.01); *G06F 3/04817* (2013.01); *G06F 3/04886* (2013.01); *G06F 2203/04808* (2013.01)

(56) References Cited

U.S. PATENT DOCUMENTS

| | | |
|---|---|---|
| 2007/0192749 A1 | 8/2007 | Baudisch |
| 2010/0325235 A1* | 12/2010 | Konno ................... H04L 67/12 709/214 |
| 2011/0285636 A1 | 11/2011 | Howard et al. |
| 2011/0295709 A1* | 12/2011 | Kubo ................. G06Q 30/0601 705/26.1 |
| 2013/0241829 A1 | 9/2013 | Kim |
| 2013/0342460 A1 | 12/2013 | Vincent et al. |
| 2014/0066200 A1 | 3/2014 | Matsui et al. |
| 2015/0049058 A1 | 2/2015 | Mao et al. |
| 2015/0182856 A1 | 7/2015 | Mays, III et al. |
| 2017/0361230 A1 | 12/2017 | Tang et al. |
| 2018/0028918 A1* | 2/2018 | Tang ..................... G06F 3/0484 |

FOREIGN PATENT DOCUMENTS

| | | |
|---|---|---|
| CN | 104267904 A | 1/2015 |
| CN | 104750419 A | 7/2015 |
| CN | 104898953 A | 9/2015 |
| CN | 104915117 A | 9/2015 |
| CN | 104922906 A | 9/2015 |
| CN | 105194873 A | 12/2015 |
| EP | 3312710 A1 | 4/2018 |
| JP | 2004073682 A | 3/2004 |
| JP | WO2015151640 A | 4/2017 |

OTHER PUBLICATIONS

Canadian Intellectual Property Office Application No. 2981553 Aug. 29, 2018 6 Pages.
The State Intellectual Property Office of the People's Republic of China (SIPO) Office Action 1 for 201510654167.4 Jan. 22, 2018 10 Pages (including translation).
IP Australia Examination report No. 2 for Application No. 2016336603 Jan. 22, 2019 7 pages.
The European Patent Office (EPO) The Extended European Search Report for 16852992.3 Oct. 25, 2018 12 Pages.
The Japan Patent Office (JPO) Notification of Reasons for Refusal for Application No. 2017-554809 Sep. 11, 2018 7 Pages (including translation).

* cited by examiner

INFORMATION PROCESSING METHOD, TERMINAL, AND COMPUTER STORAGE MEDIUM

RELATED APPLICATION

This patent application is a continuation application of PCT Patent Application No. PCT/CN2016/083208, filed on May 24, 2016, which claims priority to Chinese Patent Application No. 201510654167.4, filed by Tencent Technology (Shenzhen) Company Limited on Oct. 10, 2015, and entitled "INFORMATION PROCESSING METHOD, TERMINAL, AND COMPUTER STORAGE MEDIUM", both of which is incorporated by reference in entirety.

FIELD OF THE TECHNOLOGY

The present disclosure relates to information exchange technologies and, more particularly, to an information processing method, terminal, and computer storage medium.

BACKGROUND OF THE DISCLOSURE

With large-screen and super-screen intelligent terminals gradually gaining popularity, processors of the intelligent terminals have increasingly high processing capability, so that many applications have been developed to realize operation and control on the large-screen or super-screen based on man-machine interaction. When performing the operation and control based on man-machine interaction, multiple users may run different interaction modes by creating groups in one-to-one, one-to-many, and many-to-many formats, so as to obtain different interaction results. For example, in a graphical user interface obtained through rendering on a large screen or a super screen, after multiple users are grouped into two different groups, through the operation and control processing of man-machine interaction, information exchange may be performed between the different groups, and different interaction results are obtained according to responses to the information exchange. Through the operation and control processing of man-machine interaction, information exchange may also be performed among group members in a same group, and different interaction results are obtained according to responses to the information exchange.

In the existing technology, in an information exchange process, release of a specific skill may be triggered to enrich a presentation form and content of information, and different presentation forms and content of information may finally lead to different interaction results. However, currently, the way to release a specific skill cannot accurately and rapidly locate a target object to which the specific skill is directed, easily causing mis-operation, and impacting the interaction processing speed due to locating inaccuracy.

SUMMARY

In view of this, embodiments of the present invention provides an information processing method, terminal, and computer storage medium, so as to resolve at least one problem in the existing technology, so that a target object for skill release operation can be located accurately and rapidly, avoiding mis-operation and improving interaction processing speed due to the improved locating accuracy.

The technical solutions in the embodiments of the present invention are implemented as follows.

An embodiment of the present invention provides an information processing method implemented by a computer system. The method includes: performing rendering on a graphical user interface to obtain at least one virtual resource object; when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object; when detecting a dragging operation on the virtual joystick object, controlling a skill-release location of the skill object to be correspondingly adjusted on the graphical user interface; and determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object.

An embodiment of the present invention further provides a terminal, the terminal including: a display, a memory storing instructions, and a processor coupled to the memory. When executing the instructions, the processor is configured for: performing rendering on a graphical user interface to obtain at least one virtual resource object; when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object; when detecting a dragging operation on the virtual joystick object, controlling a skill-release location of the skill object to be correspondingly adjusted on the graphical user interface; and determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object.

An embodiment of the present invention further provides a non-transitory computer-readable storage medium. The non-transitory computer-readable storage medium contains computer-executable instructions for, when executed by a processor, performing an information processing method. The method includes: performing rendering on a graphical user interface to obtain at least one virtual resource object; when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object; when detecting a dragging operation on the virtual joystick object, controlling a skill-release location of the skill object to be correspondingly adjusted on the graphical user interface; and determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object.

DESCRIPTION OF EMBODIMENTS

Implementation of the technical solutions is further described in detail below with reference to the accompanying drawings.

Figure 1:
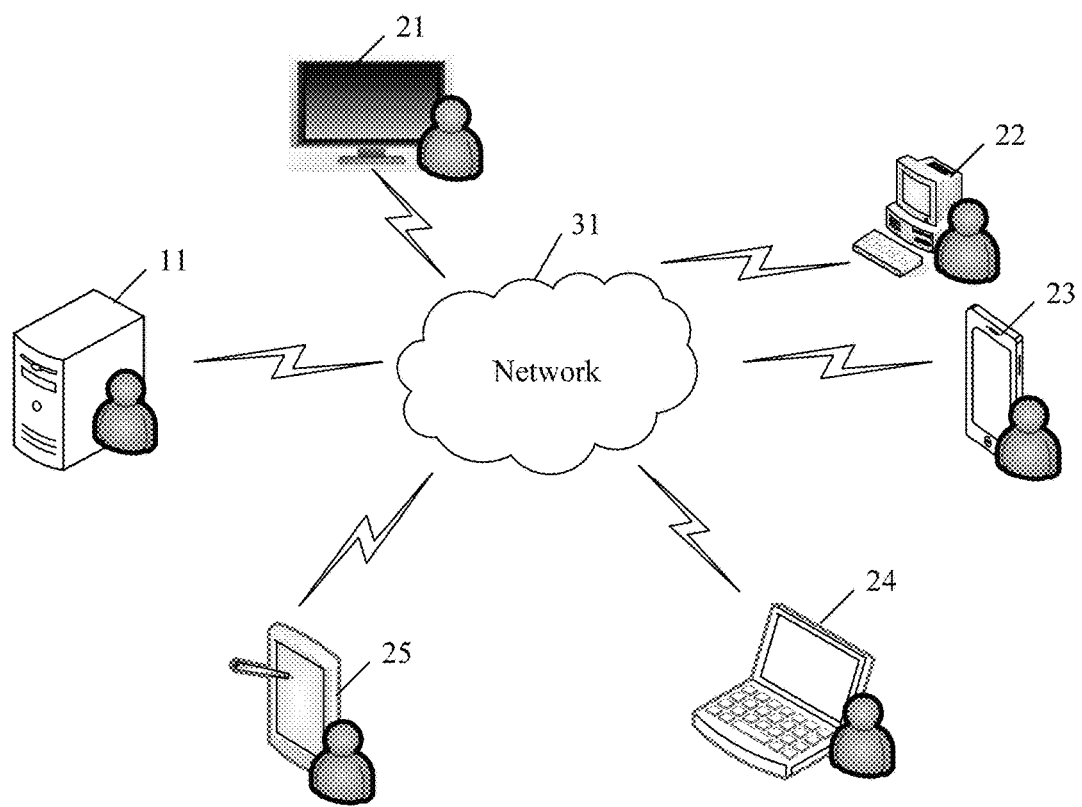
FIG. 1 is a schematic diagram of various hardware devices for performing information exchange according to an embodiment of the present invention.

FIG. 1 is a schematic diagram of various hardware devices in an operating environment for performing information exchange according to an embodiment of the present invention. As shown in FIG. 1, the operating environment includes: one or more servers, where a server 11 is only an example, terminal devices 21 to 25, and a network 31. The network 31 includes network entities such as routers and gateways (not shown).

The terminal devices 21 to 25 perform information exchange with the server by using a wired network or a wireless network, so as to download an application, an application update data packet, and/or application related data information or service information from the server 11. Various types of the terminal devices are shown in FIG. 1, including a mobile phone (terminal 23), a tablet computer or a PDA (terminal 25), a desktop computer (terminal 22), a PC (terminal 24), an all-in-one PC (terminal 21), and other types. Various applications required by a user are installed in the terminal device, for example, an application having an entertainment function (such as a video application, an audio play application, a game application, or reading software) or an application having a serving function (such as a map navigation application, or a group purchasing application).

Using the electronic game scene as an example, by using the network 31, the terminal devices 21 to 25 download a game application, a game application update data packet, and/or game application related data information or service information from the server 11 according to a requirement. According to embodiments of the present invention, after the game application is started on the terminal device and a game interface obtained through rendering is entered, when a skill-release trigger gesture is detected on at least one skill object located in at least one skill operation area in the game interface, a skill-release supplementary control object is obtained through rendering on the graphical user interface.

The skill-release supplementary control object including a skill-release control halo object and a virtual joystick object located within a radiation range of the skill-release control halo object. When a drag operation on the virtual joystick object is detected, a skill-release location of the skill object is controlled to be correspondingly adjusted on the graphical user interface; and it is determined whether the virtual joystick object is out of a threshold range. When the virtual joystick object is not out of the threshold range, based on a detected release operation of the drag operation and from a skill releasable range of the skill object, a target character object satisfying a first preset policy is selected from at least one character object. Further, a skill-release operation is performed on the selected target character object.

Because the target character object can be selected and located by determining whether a virtual joystick object touched by a user finger is out of a threshold range, it facilitates the user to respond rapidly in the information exchange process, thereby avoiding wasting user's response time on searching the graphical user interface. In such a manner of releasing the specific skill, a target object for skill-release can be located accurately and rapidly, avoiding mis-operation and improving interaction processing speed due to the improved locating accuracy.

The example in FIG. 1 is only an example of a system architecture for implementing the embodiments of the present invention, and the embodiments of the present invention are not limited to the system architecture in FIG. 1. Based on the system architecture, various embodiments of the present invention are provided in the followings.

Figure 2:
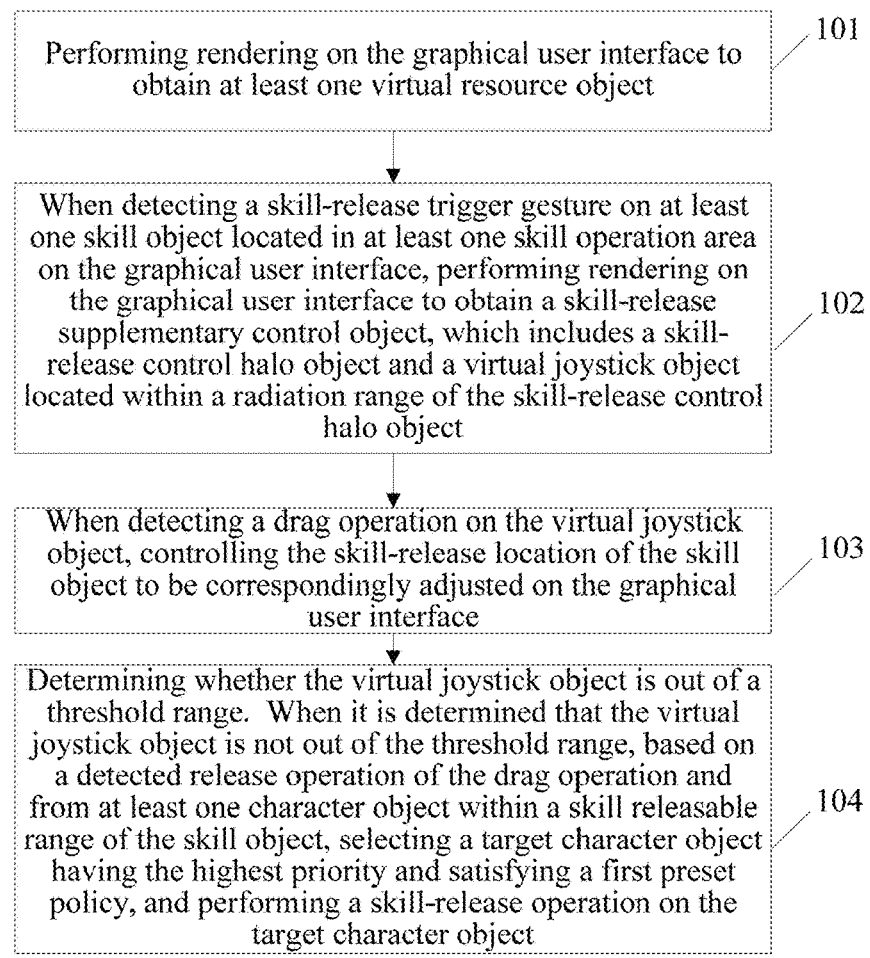
FIG. 2 is a schematic flowchart of an information processing method according to an embodiment of the present invention.

In an embodiment of the present invention, an information processing method is provided. A software application is executed on a processor of a terminal and rendering is performed on a display of the terminal to obtain a graphical user interface. The processor, the graphical user interface, and the software application are implemented in, for example, a game system. As shown in FIG. 2, the method includes the followings.

Step 101: Performing rendering on the graphical user interface to obtain at least one virtual resource object.

The virtual resource object includes various types of objects on the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill-release by the user, and the like, shall all fall within the protection scope of the "virtual resource object" of the embodiments of the present invention.

Step 102: When detecting a skill-release trigger gesture on at least one skill object located in at least one skill operation area on the graphical user interface, performing rendering on the graphical user interface to obtain a skill-release supplementary control object. The skill-release supplementary control object includes a skill-release control halo object and a virtual joystick object located within a radiation range of the skill-release control halo object.

Specifically, two methods may be used. In a first method, rendering may be performed at a preset location on the graphical user interface to obtain the skill-release supplementary control object, so as to display the skill-release supplementary control object at a default fixed location. Because the skill-release supplementary control object can appear at the preset location, that is, the default fixed location, it facilitates the user to respond rapidly in an information exchange process, thereby avoiding wasting the user's response time for searching the graphical user interface. The fixed location may be fixed with respect to the graphical user interface, with respect to one or more objects on the graphical user interface, or with respect to other types of references.

In a second method, a first location may be obtained with a touch or a slide of a finger, and rendering is performed at the first location on the graphical user interface to obtain the skill-release supplementary control object, so as to display the skill-release supplementary control object at a changeable location with a touch or a slide of the finger. Because the skill-release supplementary control object can appear at a changeable location with a touch or a slide of the finger, it can well meet the requirement of a user with a habit of rapidly performing skill-release by a slide of the finger, which is different from the requirement of a user with a habit of performing skill-release at a fixed location and aiming in a stable control area to perform skill-release, it can also facilitate the user is facilitated to respond rapidly in an information exchange process, thereby avoiding wasting the user's response time for searching the graphical user interface.

Figure 3:
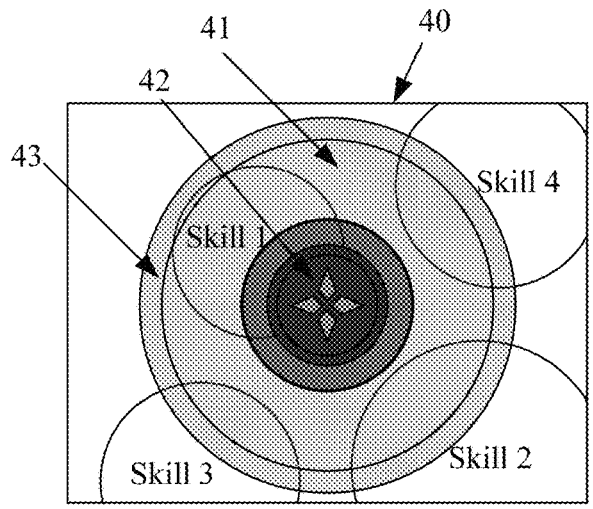
FIG. 3 is a schematic diagram of a user interface (UI) according to an embodiment of the present invention.

Using the first method as an example, as shown in FIG. 3, in a skill operation area 40 of a graphical user interface, a skill-release operation gesture applied to a skill object 1 is obtained, and rendering is performed to obtain a skill-release supplementary control object. The skill-release supplementary control object includes a skill-release control halo object 41 and a virtual joystick object 42. A skill-release control operation is subsequently triggered, so that the location of the skill-release control halo object 41 remains unchanged, and a skill releasable range specified by a skill indicator object 43 completely cover the area in which the skill-release control halo object 41 is located.

Specifically, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. It should be noted that, the skill-release control halo object and the virtual joystick object used in this specification are only examples of a skill-release controller object and a joystick object. A skill-release controller object and a joystick object that are obtained by performing rendering in a graphical user interface include, but are not limited to, a shape of a wheel, an annular shape, a ring shape, and other shapes, as long as objects that may be configured to implement skill control can be implemented.

Figure 4:
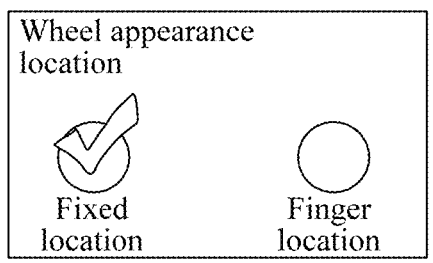
FIG. 4 is a schematic diagram of a system setting interface for generating the UI effect in FIG. 3 according to an embodiment of the present invention.

FIG. 4 is a schematic diagram of a system configuration interface. The UI effect interface shown in FIG. 3 may be obtained by the configuration interface shown in FIG. 4. As shown in FIG. 4, when a user selects an option to set the wheel appearance location to the fixed location, being matched with such setting of the user, the UI shown in FIG. 3 is subsequently obtained by performing rendering. In the UI, the center of the joystick can shift from the center of the wheel, and the skill-release control operation is triggered, so that the location of the wheel remains unchanged, and the skill releasable range specified by the skill indicator completely covers the area in which the wheel is located. The skill indicator is an indicator on which rendering is performed to supplement the user to aim or to achieve other purposes. The skill releasable range specified by the skill indicator also completely covers the skill-release control halo object.

Step 103: When detecting a drag operation on the virtual joystick object, controlling the skill-release location of the skill object to be correspondingly adjusted on the graphical user interface.

Step 104: Determining whether the virtual joystick object is out of a threshold range. When it is determined that the virtual joystick object is not out of the threshold range, based on a detected release operation of the drag operation and from at least one character object within a skill releasable range of the skill object, selecting a target character object having the highest priority and satisfying a first preset policy, and performing a skill-release operation on the target character object.

Figure 5:
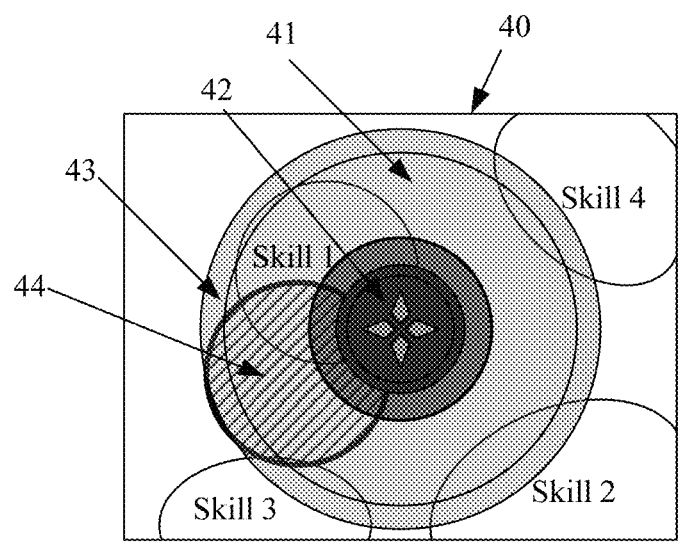
FIG. 5 is a schematic diagram of another UI according to an embodiment of the present invention.

FIG. 5 shows an example of the threshold range. As shown in FIG. 5, the virtual joystick object 42 partially overlaps a threshold range 44, and is not out of the threshold range. In such a case, a user finger release gesture is obtained to perform a subsequent action, and a character object satisfying the first preset policy is selected, from the at least one character object within the skill releasable range, as the target character object having the highest priority.

Further, performing a skill-release operation on the target character object may include: based on a release location and/or direction of the skill object obtained by the movement of the virtual joystick object along the dragging of the skill-release operation gesture, performing the skill-release operation on the target character object within the skill releasable range.

According to the embodiments of the present invention, a target character object is selected and located by determining whether a virtual joystick object touched by a user finger is out of a threshold range. A finger release gesture of the user is obtained when it is determined that the virtual joystick object touched by the user finger is not out of the threshold range; and a character object satisfying a first preset policy is selected from at least one character object within a skill releasable range as the target character object having the highest priority. A skill-release operation is then performed on the target character object within the skill releasable range according to a release location and/or direction of the skill object obtained through movement of the virtual joystick object along with the skill-release operation gesture. In such a way of releasing the specific skill, the target object for the skill-release can be located accurately and rapidly, avoiding mis-operation and improving interaction processing speed due to the improved locating accuracy.

Figure 6:
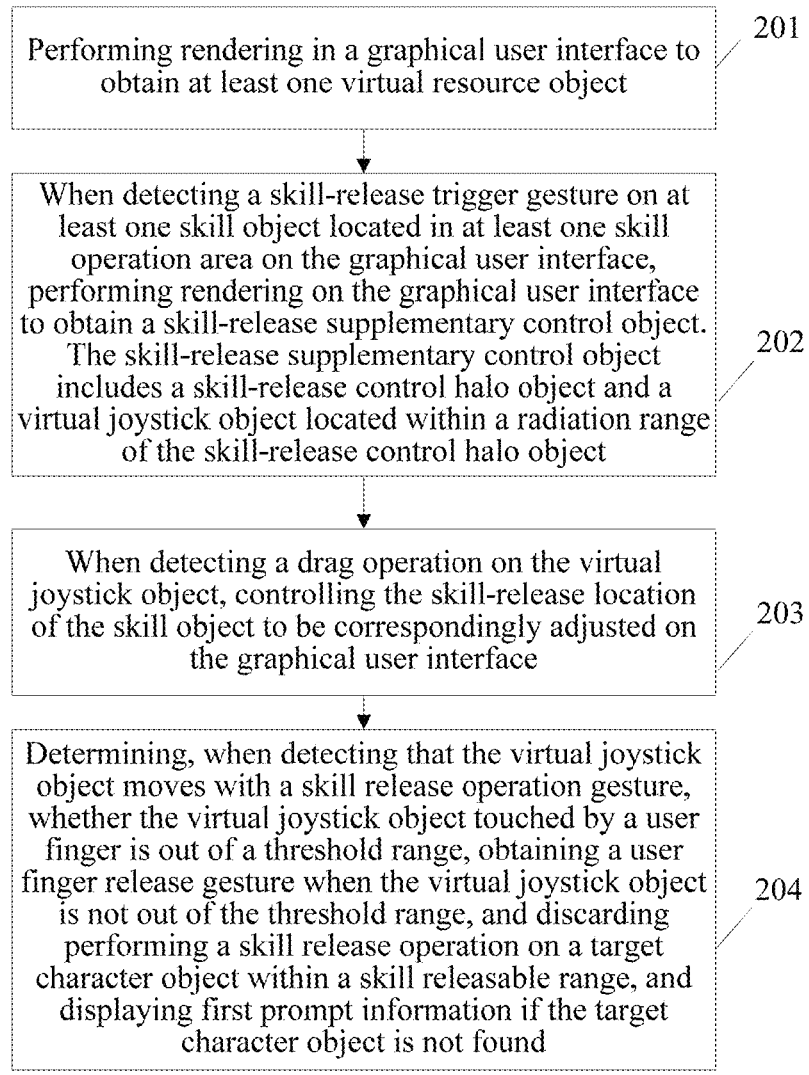
FIG. 6 is a schematic flowchart of another information processing method according to an embodiment of the present invention.

In an embodiment of the present invention, another information processing method is provided. The method is applied to an electronic device, the electronic device includes a display unit, and the display unit includes a display area. As shown in FIG. 6, the method includes the followings.

Step 201: Performing rendering in a graphical user interface to obtain at least one virtual resource object.

The virtual resource object includes various types of objects on the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill-release by the user, and the like, shall all fall within the protection scope of the "virtual resource object" of the embodiments of the present invention.

Step 202: When detecting a skill-release trigger gesture on at least one skill object located in at least one skill operation area on the graphical user interface, performing rendering on the graphical user interface to obtain a skill-release supplementary control object. The skill-release supplementary control object includes a skill-release control halo object and a virtual joystick object located within a radiation range of the skill-release control halo object.

Specifically, two methods may be used. In a first method, rendering may be performed at a preset location on the graphical user interface to obtain the skill-release supplementary control object, so as to display the skill-release supplementary control object at a default fixed location. Because the skill-release supplementary control object can appear at the preset location, that is, the default fixed location, it facilitates the user to respond rapidly in an information exchange process, thereby avoiding wasting the user's response time for searching the graphical user interface. The fixed location may be fixed with respect to the graphical user interface, with respect to one or more objects on the graphical user interface, or with respect to other types of references.

In a second method, a first location may be obtained with a touch or a slide of a finger, and rendering is performed at the first location on the graphical user interface to obtain the skill-release supplementary control object, so as to display the skill-release supplementary control object at a changeable location with a touch or a slide of the finger. Because the skill-release supplementary control object can appear at a changeable location with a touch or a slide of the finger, it can well meet the requirement of a user with a habit of rapidly performing skill-release by a slide of the finger, which is different from the requirement of a user with a habit of performing skill-release at a fixed location and aiming in a stable control area to perform skill-release, it can also facilitate the user is facilitated to respond rapidly in an information exchange process, thereby avoiding wasting the user's response time for searching the graphical user interface.

Using the first method as an example, as shown in FIG. 3, in a skill operation area 40 of a graphical user interface, a skill-release operation gesture applied to a skill object 1 is obtained, and rendering is performed to obtain a skill-release supplementary control object. The skill-release supplementary control object includes a skill-release control halo object 41 and a virtual joystick object 42. A skill-release control operation is subsequently triggered, so that the location of the skill-release control halo object 41 remains unchanged, and a skill releasable range specified by a skill indicator object 43 completely cover the area in which the skill-release control halo object 41 is located.

Specifically, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. It should be noted that, the skill-release control halo object and the virtual joystick object used in this specification are only examples of a skill-release controller object and a joystick object. A skill-release controller object and a joystick object that are obtained by performing rendering in a graphical user interface include, but are not limited to, a shape of a wheel, an annular shape, a ring shape, and other shapes, as long as objects that may be configured to implement skill control can be implemented.

FIG. 4 is a schematic diagram of a system configuration interface. The UI effect interface shown in FIG. 3 may be obtained by the configuration interface shown in FIG. 4. As shown in FIG. 4, when a user selects an option to set the wheel appearance location to the fixed location, being matched with such setting of the user, the UI shown in FIG. 3 is subsequently obtained by performing rendering. In the UI, the center of the joystick can shift from the center of the wheel, and the skill-release control operation is triggered, so that the location of the wheel remains unchanged, and the skill releasable range specified by the skill indicator completely covers the area in which the wheel is located. The skill indicator is an indicator on which rendering is performed to supplement the user to aim or to achieve other purposes. The skill releasable range specified by the skill indicator also completely covers the skill-release control halo object.

Step 203: When detecting a drag operation on the virtual joystick object, controlling the skill-release location of the skill object to be correspondingly adjusted on the graphical user interface.

Step 204: When detecting that the virtual joystick object moves along with a skill-release operation gesture, determining whether the virtual joystick object is out of a threshold range. When it is determined that the virtual joystick object is not out of the threshold range, based on a detected release operation of the drag operation and from at least one character object within a skill releasable range of the skill object, selecting a target character object having the highest priority and satisfying a first preset policy. When no such target character object can be selected within the skill releasable range, discarding the skill-release operation on a target character object within a skill releasable range, and display a first prompt message.

The first prompt message is used to represent that there is no selectable target character object within the skill releasable range.

FIG. 5 shows an example of the threshold range. As shown in FIG. 5, the virtual joystick object 42 partially overlaps a threshold range 44, and is not out of the threshold range. In such a case, a user finger release gesture is obtained to perform a subsequent action, and a character object satisfying the first preset policy is selected, from the at least one character object within the skill releasable range, as the target character object having the highest priority.

According to the embodiments of the present invention, a target character object is selected and located by determining whether a virtual joystick object touched by a user finger is out of a threshold range. A finger release gesture of the user is obtained when it is determined that the virtual joystick object touched by the user finger is not out of the threshold range, but a character object satisfying a first preset policy cannot be selected from at least one character object within a skill releasable range as the target character object, the skill-release operation on the target character object within a skill releasable range is discarded, and a first prompt message is displayed. The first prompt message is used to indicate to the user that there is no selectable target character object within the skill releasable range. In such a way of releasing the specific skill, a target object for skill-release can be located accurately and rapidly, and the skill-release operation is discarded if the target object is not found, which can avoid mis-operation and continue with other subsequent action to re-determine the target object, improving interaction processing speed due to the improved locating accuracy.

Figure 7:
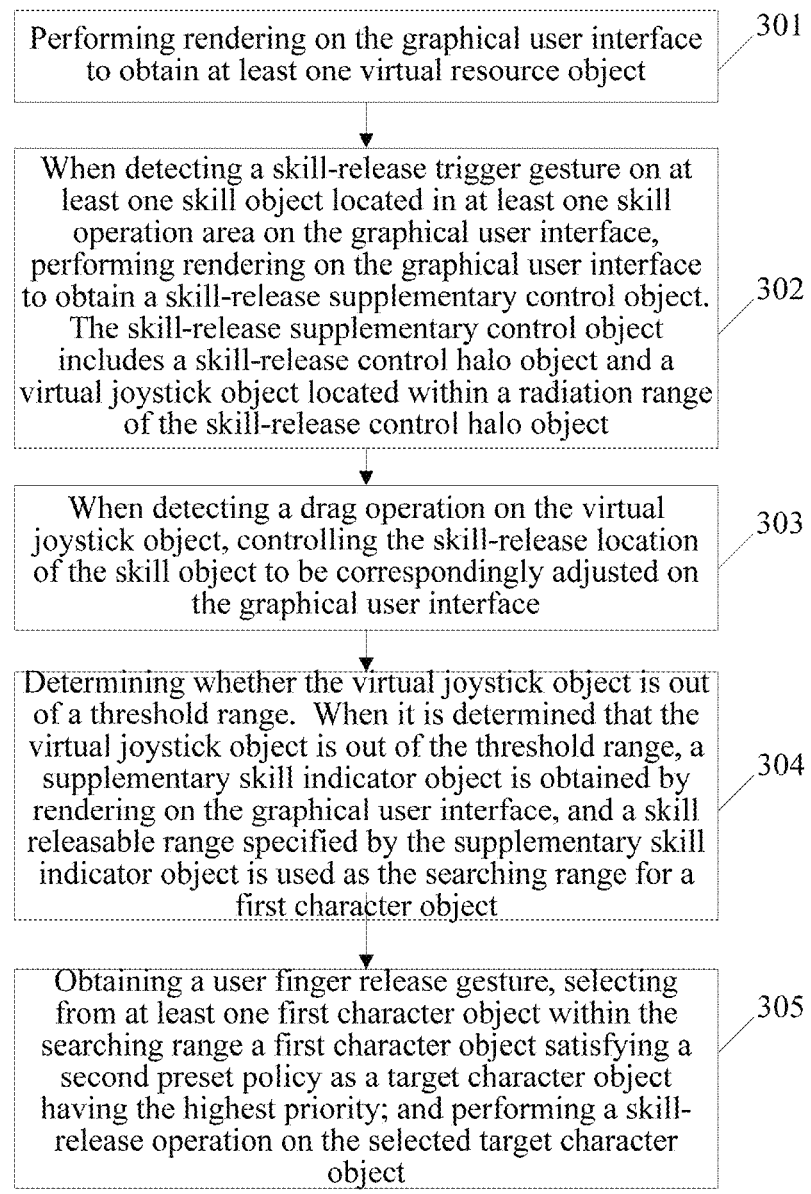
FIG. 7 is a schematic flowchart of another information processing method according to an embodiment of the present invention.

In an embodiment of the present invention, another information processing method is provided. The method is applied to an electronic device, the electronic device includes a display unit, and the display unit includes a display area. As shown in FIG. 7, the method includes the following steps:

Step 301: Performing rendering on the graphical user interface to obtain at least one virtual resource object.

The virtual resource object includes various types of objects on the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill-release by the user, and the like, shall all fall within the protection scope of the "virtual resource object" of the embodiments of the present invention.

Step 302: When detecting a skill-release trigger gesture on at least one skill object located in at least one skill operation area on the graphical user interface, performing rendering on the graphical user interface to obtain a skill-release supplementary control object. The skill-release supplementary control object includes a skill-release control halo object and a virtual joystick object located within a radiation range of the skill-release control halo object.

Specifically, two methods may be used. In a first method, rendering may be performed at a preset location on the graphical user interface to obtain the skill-release supplementary control object, so as to display the skill-release supplementary control object at a default fixed location. Because the skill-release supplementary control object can appear at the preset location, that is, the default fixed location, it facilitates the user to respond rapidly in an information exchange process, thereby avoiding wasting the user's response time for searching the graphical user interface. The fixed location may be fixed with respect to the graphical user interface, with respect to one or more objects on the graphical user interface, or with respect to other types of references.

In a second method, a first location may be obtained with a touch or a slide of a finger, and rendering is performed at the first location on the graphical user interface to obtain the skill-release supplementary control object, so as to display the skill-release supplementary control object at a changeable location with a touch or a slide of the finger. Because the skill-release supplementary control object can appear at a changeable location with a touch or a slide of the finger, it can well meet the requirement of a user with a habit of rapidly performing skill-release by a slide of the finger, which is different from the requirement of a user with a habit of performing skill-release at a fixed location and aiming in a stable control area to perform skill-release, it can also facilitate the user is facilitated to respond rapidly in an information exchange process, thereby avoiding wasting the user's response time for searching the graphical user interface.

Using the first method as an example, as shown in FIG. 3, in a skill operation area 40 of a graphical user interface, a skill-release operation gesture applied to a skill object 1 is obtained, and rendering is performed to obtain a skill-release supplementary control object. The skill-release supplementary control object includes a skill-release control halo object 41 and a virtual joystick object 42. A skill-release control operation is subsequently triggered, so that the location of the skill-release control halo object 41 remains unchanged, and a skill releasable range specified by a skill indicator object 43 completely cover the area in which the skill-release control halo object 41 is located.

Specifically, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. It should be noted that, the skill-release control halo object and the virtual joystick object used in this specification are only examples of a skill-release controller object and a joystick object. A skill-release controller object and a joystick object that are obtained by performing rendering in a graphical user interface include, but are not limited to, a shape of a wheel, an annular shape, a ring shape, and other shapes, as long as objects that may be configured to implement skill control can be implemented.

FIG. 4 is a schematic diagram of a system configuration interface. The UI effect interface shown in FIG. 3 may be obtained by the configuration interface shown in FIG. 4. As shown in FIG. 4, when a user selects an option to set the wheel appearance location to the fixed location, being matched with such setting of the user, the UI shown in FIG. 3 is subsequently obtained by performing rendering. In the UI, the center of the joystick can shift from the center of the wheel, and the skill-release control operation is triggered, so that the location of the wheel remains unchanged, and the skill releasable range specified by the skill indicator completely covers the area in which the wheel is located. The skill indicator is an indicator on which rendering is performed to supplement the user to aim or to achieve other purposes. The skill releasable range specified by the skill indicator also completely covers the skill-release control halo object.

Step 303: When detecting a drag operation on the virtual joystick object, controlling the skill-release location of the skill object to be correspondingly adjusted on the graphical user interface.

Step 304: Determining whether the virtual joystick object is out of a threshold range. When it is determined that the virtual joystick object is out of the threshold range, a supplementary skill indicator object is obtained by rendering on the graphical user interface, and a skill releasable range specified by the supplementary skill indicator object is used as the searching range for a first character object.

Figure 8:
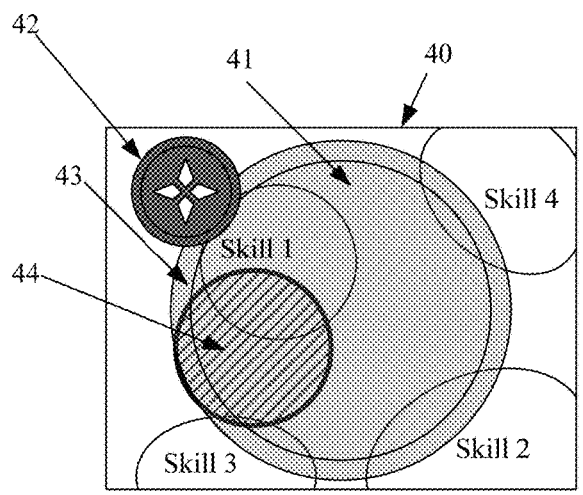
FIG. 8 to FIG. 10 are schematic diagrams of multiple UIs according to embodiments of the present invention.

FIG. 8 shows an example of the threshold range. As shown in FIG. 8, the virtual joystick object 42 is located at an edge of the skill-release control halo object 41, and is out of a threshold range 44. Further, the supplementary skill indicator object includes a fan-shaped indicator object (other shapes, such as an annular shape or a square shape, can also be used). The fan-shaped indicator object is different from the skill indicator object 43, and has a smaller attack range, so as to specify a target character object having the highest priority within a skill releasable range specified by the fan-shaped indicator object (also referred to as a searching range or an enemy-searching range).

Step 305: Obtaining a user finger release gesture, selecting from at least one first character object within the searching range a first character object satisfying a second preset policy as a target character object having the highest priority; and performing a skill-release operation on the selected target character object.

Specifically, within the searching range, based on the release location and/or direction of the skill object obtained by the virtual joystick object following the dragging motion of the skill-release operation gesture, the skill-release operation is performed on the target character object.

According to the embodiment of the present invention, a target character object is selected and located by determining whether a virtual joystick object touched by a user finger is out of a threshold range and, when it is determined that the virtual joystick object touched by the user finger is out of the threshold range, rendering is performed on the graphical user interface to obtain a supplementary skill indicator object. The skill releasable range specified by the supplementary skill indicator object is a searching range of a first character object. Further, a user finger release gesture is obtained, and a first character object satisfying a second preset policy as the target character object having the highest priority is selected from at least one first character object within the searching range; and the skill-release operation is performed on the target character object within the searching range. In such a way of releasing the specific skill, a target object for skill-release can be located accurately and rapidly, avoiding mis-operation and improving interaction processing speed due to the improved locating accuracy.

According to the above embodiments, when selecting and locating a target character object by determining whether the virtual joystick object touched by the user finger is out of a threshold range, the skill-release control halo object (such as a wheel) may have two threshold ranges, and the virtual joystick object (such as a joystick) may move within the two ranges, so as to implement skill-release. If a skill moves within the innermost range, a release target is automatically searched within the skill-releasable-range centering around a player character object (or a release target is searched in a direction along a connection line from a center of the wheel to the joystick). When there is no target, the skill-release operation is not performed and a prompt is displayed.

On the other hand, when a user drags the joystick to an area within the outermost threshold range, a skill indicator having a fan shape or another shape (such as a fan-shaped indicator) is displayed using the connection line from the center of the wheel to the joystick as a centerline and the player character target as the center point.

In an implementation of the embodiment of the present invention, the performing rendering on the graphical user interface to obtain a supplementary skill indicator object includes: obtaining a first relative direction formed by the virtual joystick object relative to a center of the skill-release control halo object, and generating, in the first relative direction, a first target selection direction line by using a connection line to a center point of the skill indicator object; and forming the supplementary skill indicator object based on positive and negative offsets on a preset angle and centering the first target selection direction line.

Figure 9:
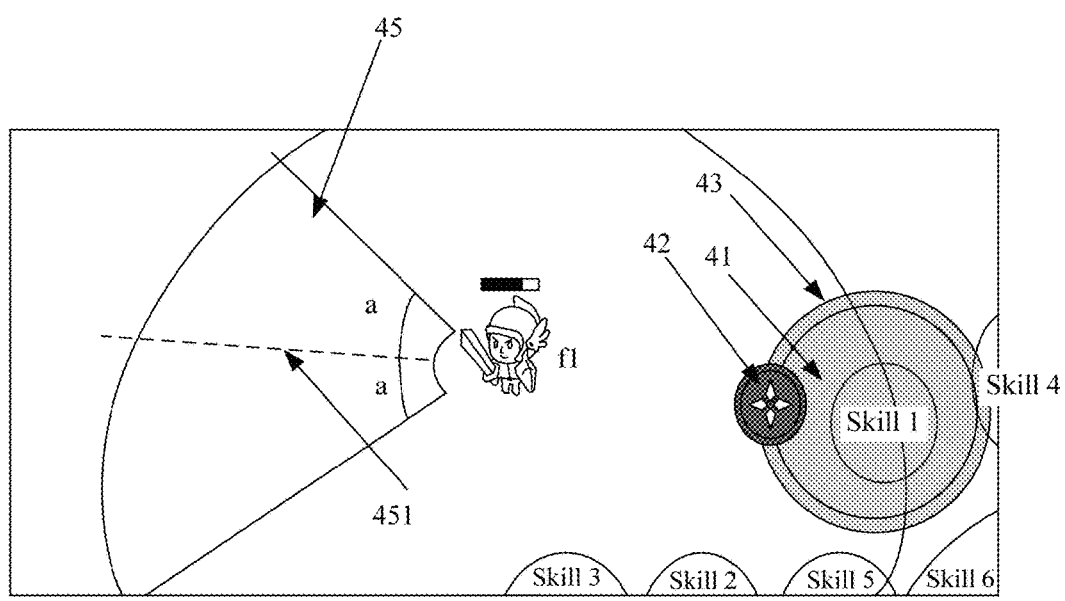

For example, as shown in FIG. 9, in a skill operation area of a graphical user interface, a skill-release operation gesture applied on a skill object 1 is obtained, and rendering is performed to obtain a skill-release supplementary control object. The skill-release supplementary control object includes the skill-release control halo object 41 and the virtual joystick object 42. A skill-release control operation is subsequently triggered, so that the location of the skill-release control halo object 41 remains unchanged, and a skill releasable range specified by a skill indicator object 43 completely covers an area in which the skill-release control halo object 41 is located.

Specifically, as shown in FIG. 9, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator.

Rendering is performed on the graphical user interface to obtain a supplementary skill indicator object when the virtual joystick object touched by a user finger is out of the threshold range, such as a fan-shaped indicator object 45 in FIG. 9. The fan-shaped indicator object 45 has a first target selection direction line 451, which is the direction of the connection line from the virtual joystick object and the skill-release control halo object. Using the player character f1 as an original point and centering around the first target selection direction line 451, the fan-shaped indicator object 45 is formed based on positive and negative offsets on the preset angle 'a'. In FIG. 9, a person f1 is a member of the user's side.

In an implementation of the embodiment of the present invention, the method further includes: each time it is detected that a location of the virtual joystick object changes relative to the center of the skill-release control halo object, refreshing the first relative direction to a second relative direction, and generating, in the second relative direction, a second target selection direction line by using a connection line to the center point of the skill indicator object; and selecting a first character object with the shortest vertical distance to the second target selection direction line as the target character object having the highest priority and highlighting the target character object, so as to re-determine and refresh the target character object each time the virtual joystick object moves, and to highlight a new target character object obtained through to refreshing.

Figure 10:
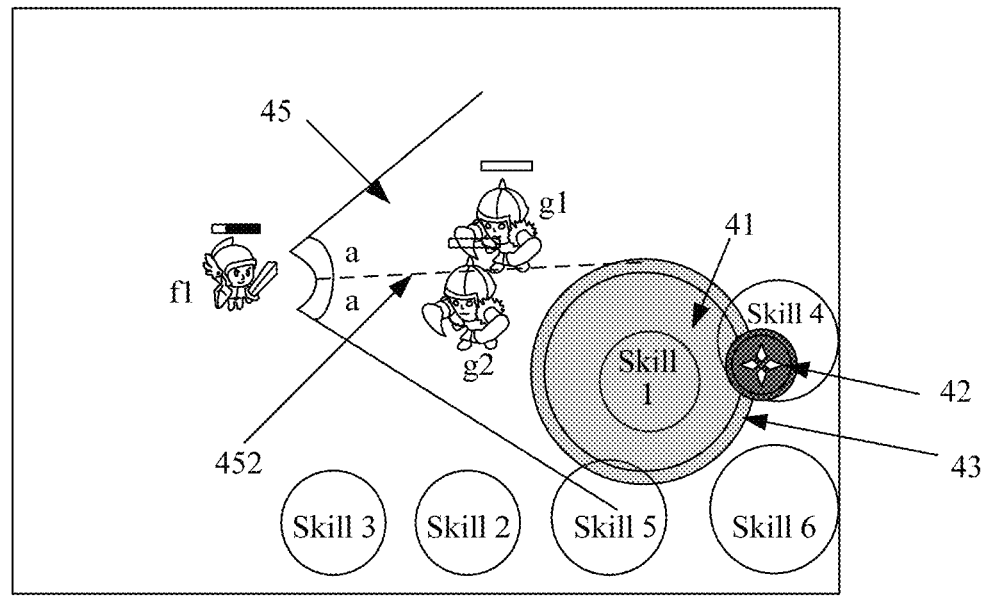

For example, as shown in FIG. 10, in a skill operation area of a graphical user interface, a skill-release operation gesture applied to a skill object 1 is obtained, and rendering is performed to obtain a skill-release supplementary control object. The skill-release supplementary control object includes a skill-release control halo object 41 and a virtual joystick object 42. A skill-release control operation is subsequently triggered, so that a location of the skill-release control halo object 41 remains unchanged, and a skill releasable range specified by a skill indicator object 43 completely covers an area in which the skill-release control halo object 41 is located.

Comparing with FIG. 9, in FIG. 10, after the virtual joystick object 42 moves relative to the skill-release control halo object 41, the first target selection direction line 451 needs to be refreshed to the current second target selection direction line 452. In this case, the fan-shaped indicator object 45 has the second target selection direction line 452 obtained through refreshing. Centering around the second target selection direction line 452, the fan-shaped indicator object 45 is formed based on positive and negative offsets on the preset angle a. In FIG. 10, the personnel f1 is a member of the user's side, and persons g1 and g2 are enemies (members of the opposing side).

In a process of implementing control based on manmachine interaction on the graphical user interface, different groups can be created by multiple users in a one-to-one, one-to-many, and many-to-many formats to run different interaction modes. Therefore, different interaction results can be obtained. The different interaction modes include a versus mode between multiple online users, and further include an offline versus mode without an Internet connection.

The versus mode between multiple users and the offline versus mode without an Internet connection are both applicable to the UIs shown in FIG. 3, FIG. 5, FIG. 8, FIG. 9, and FIG. 10. It should be noted that, the UIs shown in FIG. 3, FIG. 5, FIG. 8, FIG. 9, and FIG. 10 are obtained through rendering by a processor of a terminal device, which is specifically an image processor. This is only a specific example. The specific example is applicable to different personnel deployment scenarios in a game, for example, numbers of deployed persons of two parties are 1 to 1, 3 to 3, or 5 to 5, and is also applicable to scenarios in which numbers of deployed persons of two parties are different in a game, for example, a scenario in which numbers of deployed persons are 40 to 20 or 30 to 60, to run a mode in a game in which a skill-release location and direction are determined by using a wheel at a fixed location. For example, for the versus mode between multiple online users, the multiple users are grouped into different groups, each group includes at least one group member, and the different groups are marked as at least a first group (for example, own group) and a second group (for example, an opponent group). If there is only one person in the own group, and there is also only one person in the opponent group, it is the "1 to 1" mode mentioned above. If there are only three persons in the own group, and there are also three persons in the opponent group, it is the "3 to 3" mode mentioned above. If there are only five persons in the own group, and there are also only five persons in the opponent group, it is the "5 to 5" mode mentioned above. Certainly, for the opponent group and own group, it is not necessarily to deploy a same number of persons, and different numbers of persons may be deployed.

In an implementation of the embodiment of the present invention, the selecting, from at least one first character object within the searching range, a first character object satisfying a second preset policy as the target character object having the highest priority includes: when the searching range includes multiple first character objects, selecting a first character object with the shortest vertical distance to the first target selection direction line as the target character object having the highest priority, and highlighting the target character object.

In an implementation of the embodiment of the present invention, the method further includes: when it is determined that the virtual joystick object touched by a user finger is out of the threshold range, performing rendering on the graphical user interface to obtain a supplementary skill indicator object, where a skill releasable range specified by the supplementary skill indicator object is a searching range of a first character object; obtaining a user finger release gesture and, when no first character object can be found within the searching range, discarding performing the skill-release operation on the target character object within the searching range, and displaying a second prompt message, where the second prompt message is used to represent that there is no selectable target character object within the searching range.

Figure 11:
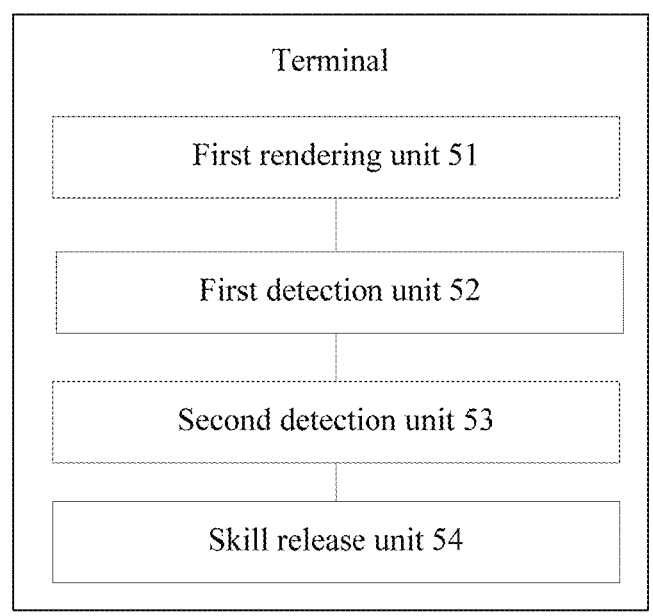
FIG. 11 is a schematic diagram of an information processing terminal according to an embodiment of the present invention.

In an embodiment of the present invention, a terminal is provided. A software application is executed on a processor of the terminal and rendering is performed on a display of the terminal to obtain a graphical user interface. The processor, the graphical user interface, and the software application are implemented in a game system. As shown in FIG. 11, the terminal further includes a first rendering unit 51, a first detection unit 52, a second detection unit 53, and a skill-release unit 54.

The first rendering unit 51 is configured to perform rendering on the graphical user interface to obtain at least one virtual resource object.

The first detection unit 52 is configured to: when detecting a skill-release trigger gesture on at least one skill object located in at least one skill operation area on the graphical user interface, perform rendering on the graphical user interface to obtain a skill-release supplementary control object. The skill-release supplementary control object including a skill-release control halo object and a virtual joystick object located within a radiation range of the skill-release control halo object.

The second detection unit 53 is configured to: when detecting a drag operation on the virtual joystick object, control the skill-release location of the skill object to be correspondingly adjusted on the graphical user interface.

The skill-release unit 54 is configured to: determine whether the virtual joystick object is out of a threshold range and, when the virtual joystick object is not out of the threshold range, based on a detected release operation of the drag operation and from at least one character object within a skill releasable range of the skill object, select a target character object having the highest priority and satisfying a first preset policy, and perform a skill-release operation on the target character object. The skill-release operation is performed on the target character object within the skill releasable range according to a release location and/or direction of the skill object obtained by the movement of the virtual joystick object along the dragging of the skill-release operation gesture.

In an application of the embodiments of the present invention, the virtual resource object includes various types of objects on the graphical user interface. For example, a user avatar icon for representing a user, an object for representing a building, a tree, tower defense, or the like in a background, an object for representing a status (such as a blood value or a vitality value) of the user, an object for representing a skill, equipment, or the like of the user, a direction button object for controlling a change of a location of the user, a rendering object used during skill-release by the user, and the like, shall all fall within the protection scope of the "virtual to resource object" of the embodiments of the present invention.

Specifically, two methods may be used for rendering on the graphical user interface. In a first method, rendering may be performed at a preset location on the graphical user interface to obtain the skill-release supplementary control object, so as to display the skill-release supplementary control object at a default fixed location. Because the skill-release supplementary control object can appear at the preset location, that is, the default fixed location, it facilitates the user to respond rapidly in an information exchange process, thereby avoiding wasting the user's response time for searching the graphical user interface. The fixed location may be fixed with respect to the graphical user interface, with respect to one or more objects on the graphical user interface, or with respect to other types of references.

In a second method, a first location may be obtained with a touch or a slide of a finger, and rendering is performed at the first location on the graphical user interface to obtain the skill-release supplementary control object, so as to display the skill-release supplementary control object at a changeable location with a touch or a slide of the finger. Because the skill-release supplementary control object can appear at a changeable location with a touch or a slide of the finger, it can well meet the requirement of a user with a habit of rapidly performing skill-release by a slide of the finger, which is different from the requirement of a user with a habit of performing skill-release at a fixed location and aiming in a stable control area to perform skill-release, it can also facilitate the user is facilitated to respond rapidly in an information exchange process, thereby avoiding wasting the user's response time for searching the graphical user interface.

Using the first method as an example, as shown in FIG. 3, in a skill operation area 40 of a graphical user interface, a skill-release operation gesture applied to a skill object 1 is obtained, and rendering is performed to obtain a skill-release supplementary control object. The skill-release supplementary control object includes a skill-release control halo object 41 and a virtual joystick object 42. A skill-release control operation is subsequently triggered, so that the location of the skill-release control halo object 41 remains unchanged, and a skill releasable range specified by a skill indicator object 43 completely cover the area in which the skill-release control halo object 41 is located.

Specifically, as shown in FIG. 3, the skill-release control halo object 41 may have a shape of a wheel and may be referred to as a wheel; the virtual joystick object 42 may have an annular shape or a ring shape and may be referred to as a joystick; and the skill indicator object 43 may have a shape of a wheel, and may be referred to as a skill indicator. It should be noted that, the skill-release control halo object and the virtual joystick object used in this specification are only examples of a skill-release controller object and a joystick object. A skill-release controller object and a joystick object that are obtained by performing rendering in a graphical user interface include, but are not limited to, a shape of a wheel, an annular shape, a ring shape, and other shapes, as long as objects that may be configured to implement skill control can be implemented.

FIG. 4 is a schematic diagram of a system configuration interface. The UI effect interface shown in FIG. 3 may be obtained by the configuration interface shown in FIG. 4. As shown in FIG. 4, when a user selects an option to set the wheel appearance location to the fixed location, being matched with such setting of the user, the UI shown in FIG. 3 is subsequently obtained by performing rendering. In the UI, the center of the joystick can shift from the center of the wheel, and the skill-release control operation is triggered, so that the location of the wheel remains unchanged, and the skill releasable range specified by the skill indicator completely covers the area in which the wheel is located. The skill indicator is an indicator on which rendering is performed to supplement the user to aim or to achieve other purposes. The skill releasable range specified by the skill indicator also completely covers the skill-release control halo object.

FIG. 5 shows an example of the threshold range. As shown in FIG. 5, the virtual joystick object 42 partially overlaps a threshold range 44, and is not out of the threshold range. In such a case, a user finger release gesture is obtained to perform a subsequent action, and a character object satisfying the first preset policy is selected, from the at least one character object within the skill releasable range, as the target character object having the highest priority.

FIG. 8 shows an example of the threshold range. As shown in FIG. 8, the virtual joystick object 42 is located at an edge of the skill-release control halo object 41, and is out of a threshold range 44. Further, the supplementary skill indicator object includes a fan-shaped indicator object (other shapes, such as an annular shape or a square shape, can also be used). The fan-shaped indicator object is different from the skill indicator object 43, and has a smaller attack range, so as to specify a target character object having the highest priority within a skill releasable range specified by the fan-shaped indicator object (also referred to as a searching range or an enemy-searching range).

For example, as shown in FIG. 9, in a skill operation area of a graphical user interface, a skill-release operation gesture applied on a skill object 1 is obtained, and rendering is performed to obtain a skill-release supplementary control object. The skill-release supplementary control object includes the skill-release control halo object 41 and the virtual joystick object 42. A skill-release control operation is subsequently triggered, so that the location of the skill-release control halo object 41 remains unchanged, and a skill releasable range specified by a skill indicator object 43 completely covers an area in which the skill-release control halo object 41 is located.

Comparing with FIG. 9, in FIG. 10, after the virtual joystick object 42 moves relative to the skill-release control halo object 41, the first target selection direction line 451 needs to be refreshed to the current second target selection direction line 452. In such a case, the fan-shaped indicator object 45 has the second target selection direction line 452 obtained through refreshing. Centering around the second target selection direction line 452, the fan-shaped indicator object 45 is formed based on positive and negative offsets on the preset angle a.

In an implementation of the embodiment of the present invention, the terminal further includes a skill-release cancellation unit, which is configured to: when a determining result is that the virtual joystick object touched by a user finger is not out of the threshold range, obtain a user finger release gesture and, if the target character object is not found within the skill releasable range, discard the skill-release operation on the target character object within the skill releasable range, and a display first prompt message, where the first prompt message is used to represent that there is no selectable target character object within the skill releasable range.

In an implementation of this embodiment of the present invention, the terminal further includes a second rendering unit and a skill-release unit.

The second rendering unit is configured to, when it is determined that the virtual joystick object touched by a user finger is out of the threshold range, perform rendering on the graphical user interface to obtain a supplementary skill indicator object, where a skill releasable range specified by the supplementary skill indicator object is a searching range of a first character object.

The skill-release unit is configured to: obtain a user finger release gesture, and select, from at least one first character object within the searching range, a first character object satisfying a second preset policy as the target character object having the highest priority; and perform the skill-release operation on the target character object within the searching range.

In an implementation of this embodiment of the present invention, the second rendering unit is further configured to: obtain a first relative direction formed by the virtual joystick object relative to a center of the skill-release control halo object, generate a first target selection direction line in the first relative direction by using a connection line to a center point of the skill indicator object; and, centering around the first target selection direction line, form the supplementary skill indicator object based on positive and negative offsets plus a preset angle.

In an implementation of this embodiment of the present invention, the skill-release unit is further configured to, when the searching range includes multiple first character objects, select a first character object with the shortest vertical distance to the first target selection direction line as the target character object having the highest priority, and to highlight the target character object.

In an implementation of this embodiment of the present invention, the terminal further includes a refreshing unit, which is configured to: each time it is detected that a location of the virtual joystick object changes relative to the center of the skill-release control halo object, refresh the first relative direction to a second relative direction and generate, in the second relative direction, a second target selection direction line by using a connection line to the center point of the skill indicator object; and select a first character object with the shortest vertical distance to the second target selection direction line as the target character object having the highest priority, and highlight the target character object, to re-determine and refresh the target character object each time the virtual joystick object moves, and highlight a new target character object obtained through refreshing.

In an implementation of this embodiment of the present invention, the terminal further includes a skill-release unit, which is configured to: when it is determined that the virtual joystick object touched by a user finger is out of the threshold range, perform rendering on the graphical user interface to obtain a supplementary skill indicator object, where a skill releasable range specified by the supplementary skill indicator object is a searching range of a first character object; obtain a user finger release gesture and, if the first character object used as the target character object is not found from the searching range, discard performing the skill-release operation on the target character object within the searching range, and display second prompt message, where the second prompt message is used to represent that there is no selectable target character object within the searching range.

Figure 12:
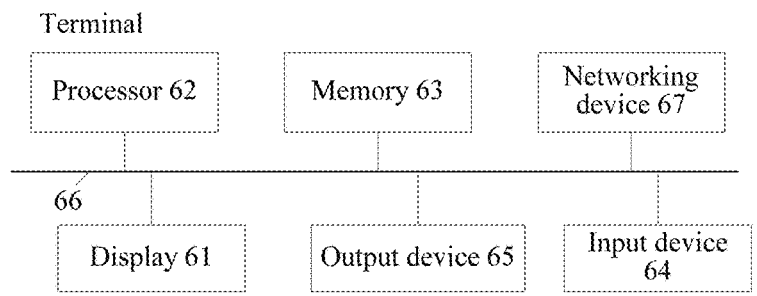
FIG. 12 is a schematic hardware structural diagram of an information processing terminal according to an embodiment of the present invention.

In an embodiment of the present invention, a terminal is provided. As shown in FIG. 12, the terminal includes: a display 61 and a processor 62. The display 61 is configured to: execute a software application on the processor of the terminal and then perform rendering on the software application, to obtain a graphical user interface. The graphical user interface is configured to facilitate control processing in man-machine interaction. The processor 62 is configured to perform the information processing method in the embodiments of the present invention. The processor, the graphical user interface, and the software application are implemented in a game system.

Further, the terminal further includes: a memory 63, an input device 64 (for example, a peripheral device such as a collection device including a camera, a microphone, and a headset; a mouse, a joystick, or a desktop computer keyboard; or a physical keyboard or a touchscreen on a notebook computer or a tablet computer), an output device 65 (for example, an audio output device or a video output device including a speaker, a headset, and the like), a bus 66, and a networking device 67. The processor 62, the memory 63, the input device 64, the display 61, and the networking device 67 are connected by using the bus 66, and the bus 66 is used for data transmission and communication between the processor 62, the memory 63, the display 61, and the networking device 67.

The input device 64 is mainly configured to obtain an input operation of a user, and the input device 64 may vary with the terminal. For example, when the terminal is a PC, the input device 64 may be an input device such as a mouse or a keyboard; when the terminal is portable device such as a smartphone or a tablet computer, the input device 64 may be a touchscreen. The networking device 67 is used by multiple terminals and a server to connect and upload and download data by using a network, and used by multiple terminals to connect and perform data transmission by using a network.

The server may be formed by a cluster system, and to implement functions of various units, the functions may be combined or functions of the units are separately provided in an electronic device. Either the terminal or the server at least includes a database for storing data and a processor for data processing, or includes a storage medium disposed in the server or a storage medium that is disposed separately. For the processor for data processing, during processing, a microprocessor, a central processing unit (CPU), a digital signal processor (DSP), or a field programmable gate array (FPGA) may be used for implementation. The storage medium includes an operation instruction, the operation instruction may be computer executable code, and steps in the procedure of the information processing method in the embodiments of the present invention are implemented by using the operation instruction.

In an embodiment of the present invention, a computer storage medium is provided. A computer executable instruction is stored in the computer storage medium, and the computer executable instruction is configured to perform the information processing method in the embodiments of the present invention.

For example, an application scenario of a game system may be implemented according the embodiments of the present invention.

This application scenario is related to Multiplayer Online Battle Arena Games (MOBA). In MOBA, related terms are as follows: 1) the UI layer, that is, icons in the graphical user interface; 2) a skill indicator: used to supplement a skill-release special effect, halo, or operation; 3) lens, which may be understood as a camera in the game; 4) mini map: a scaled-down version of a large map, which may be understood as a radar map, where information and locations of two parties are displayed in the map; 5) wheel: a halo displayed above a skill key when the skill key is pressed; and 6) virtual joystick: a control for an operation and locating on the wheel.

Figure 13:
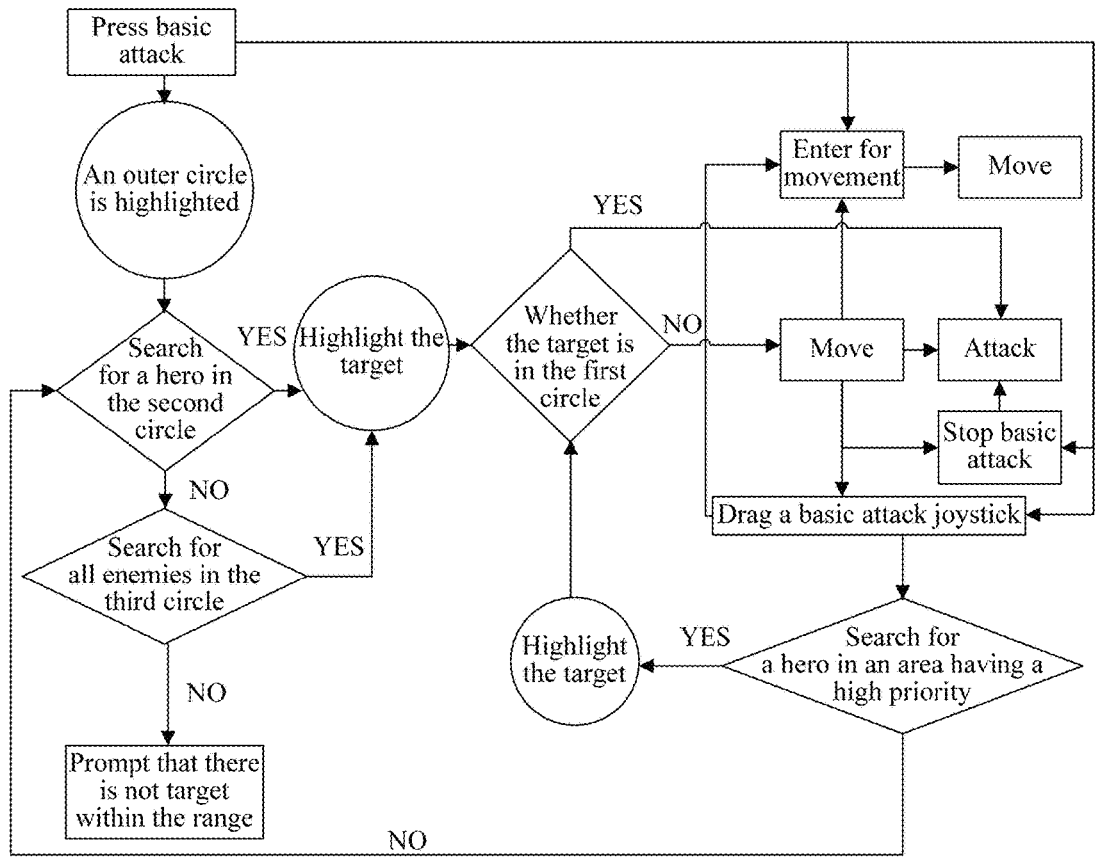
FIG. 13 is a schematic flowchart of implementation of a specific application scenario according to an embodiment of the present invention.

As shown in FIG. 13, a flow chart of the application scenario includes the followings, where the first circle is an indicator, the second circle is a secondary attack range, and the third circle is an enemy searching range.

1. When a player presses a skill key, a system invokes a supplementary spellcasting wheel, and detects whether a virtual joystick touched by a finger of the player is out of a movement threshold set by the system. When the joystick is not out of a threshold range (as shown in FIG. 5), the player releases the finger, and the system searches, within a skill releasable range according to a determined priority, for a target currently having the highest priority, and performs skill-release on the target (which is also referred to as an automatic enemy searching mechanism). If there is no target within the range, the system discards current spellcasting, and prompts the player that "there is no selectable target within the range". After the joystick is out of the threshold range (as shown in FIG. 5), the followings in (2) are performed.

2. When the joystick is out of the threshold range (as shown in FIG. 5), in a scene, a fan-shaped indicator is invoked, and is projected to the scene at a location of the joystick relative to a center of the wheel, and a connection line to a center point is drawn in a relative direction, a target selection direction line, as a fan shape of 90 degrees formed based on positive and negative 45 degrees centering around the direction line, as shown in FIG. 9. In the fan shape of 90 degrees, a hero is selected as a skill target and is highlighted. If there are multiple heroes within the range, a hero with the shortest vertical distance to the direction line is selected as a skill target and highlighted.

3. Target determination is refreshed each time the virtual joystick moves, as shown in FIG. 10, and a new target is highlighted immediately. In this case, when the finger is released, the skill-release operation is performed on the highlighted target. If there is no target within the range, the player is prompted that "there is no selectable target within the range", and skill-release is canceled.

Figure 14:
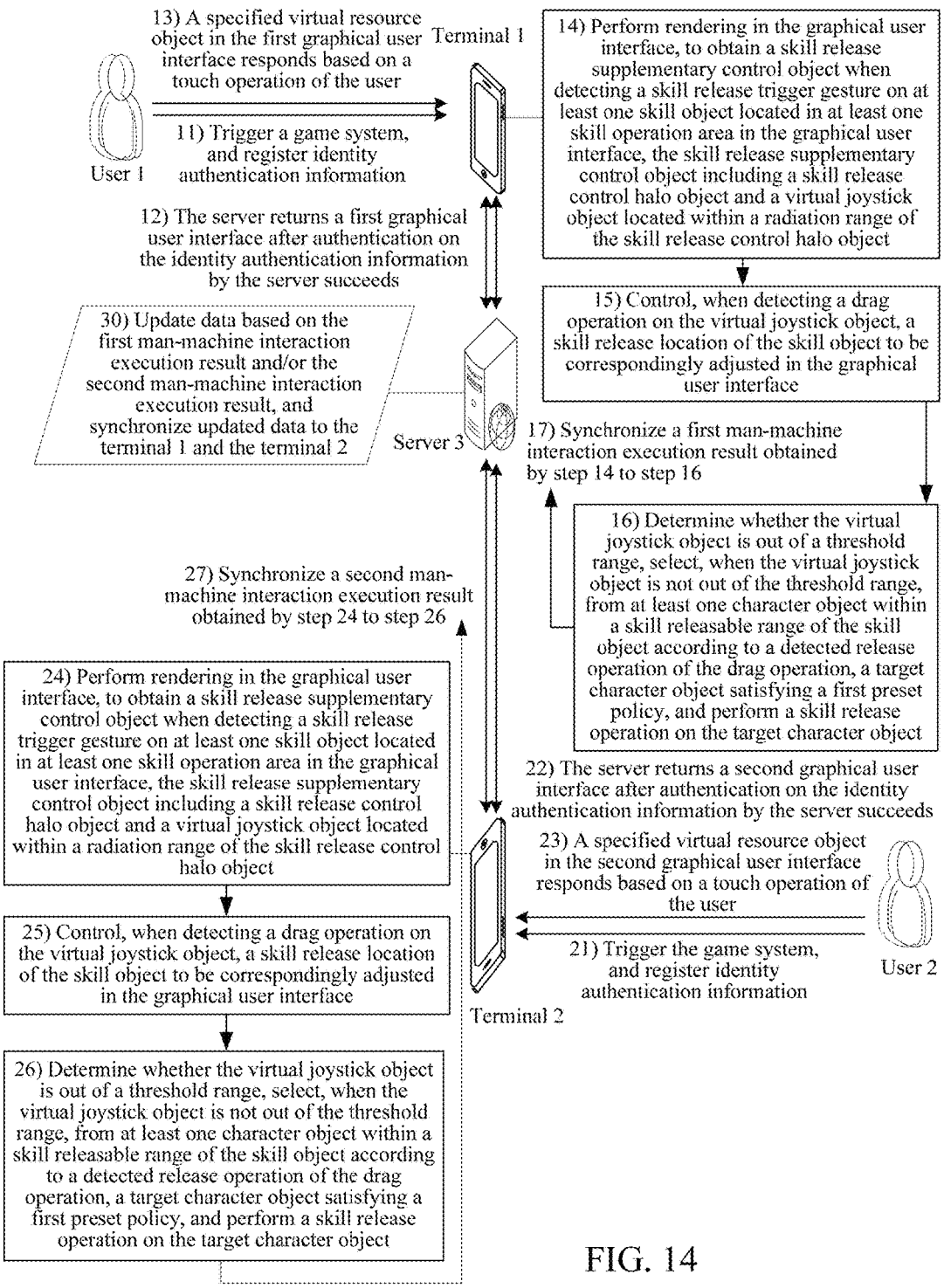
FIG. 14 is a schematic flowchart of implementation of another specific application scenario according to an embodiment of the present invention.

FIG. 14 is a schematic flowchart of specific interaction in an information processing method in this application scenario. As shown in FIG. 14, in this application scenario, a terminal 1, a terminal 2, and a server are included. The user 1 performs triggering and control by using the terminal 1, and the user 2 performs triggering and control by using the terminal 2; and the method includes the followings.

For the user 1, step 11 to step 16 are included.

Step 11: The user 1 triggers the game system by using the terminal 1, and registers identity authentication information, where the identity authentication information may be a user name and a password.

Step 12: The terminal 1 transmits the obtained identity authentication information to the server 3, and the server 3 performs identity authentication, and returns a first graphical user interface to the terminal 1 after the identity authentication succeeds, where the first graphical user interface includes a virtual resource object.

Step 13: A specified virtual resource object (such as an SMS message object in FIG. 3) can respond based on a touch operation of the user 1, and performs a series of virtual operations in step 14 to step 17.

Step 14: Terminal 1 performs rendering on the graphical user interface to obtain a skill-release supplementary control object when detecting a skill-release trigger gesture on at least one skill object located in at least one skill operation area on the graphical user interface, the skill-release supplementary control object including a skill-release control halo object and a virtual joystick object located within a radiation range of the skill-release control halo object. The skill releasable range specified by the skill indicator object completely covers the area in which the skill-release control halo object is located.

Step 15: Controlling, when detecting a drag operation on the virtual joystick object, a skill-release location of the skill object to be correspondingly adjusted on the graphical user interface.

Step 16: Determining whether the virtual joystick object is out of a threshold range, when the virtual joystick object is not out of the threshold range, according to a detected release operation of the drag operation, select a target character object satisfying a first preset policy from at least one character object within a skill releasable range of the skill object, and perform a skill-release operation on the target character object.

Step 17: Synchronizing an execution result obtained by performing step 14 to step 16 to the server, or instantly transferring the execution result to the terminal 2 by using the server, or directly forward the execution result to the terminal 2, so that the user 2 that logs in to the game system by using the terminal 2 can respond to the virtual operation of the user 1, so as to implement interaction between multiple terminals. In this application scenario, only interaction between two terminals is used as an example, and during an actual operation, interaction between multiple terminals may be not limited to interaction between the two terminals in this example.

For the user 2, step 21 to step 26 are included.

Step 21: The user 2 triggers the game system by using the terminal 2, and registers identity authentication information, where the identity authentication information may be a user name and a password.

Step 22: The terminal 2 transmits the obtained identity authentication information to the server 3, and the server 3 performs identity authentication, and returns a second graphical user interface to the terminal 2 after the identity authentication succeeds, where the second graphical user interface includes a virtual resource object.

Step 23: A specified virtual resource object (such as an SMS message object in FIG. 3) can respond based on a touch operation of the user 2, and performs a series of virtual operations in step 24 to step 27.

Step 24: When detecting a skill-release trigger gesture on at least one skill object located in at least one skill operation area on the graphical user interface, terminal 2 performs rendering on the graphical user interface to obtain a skill-release supplementary control object, where the skill-release supplementary control object includes a skill-release control halo object and a virtual joystick object located within a radiation range of the skill-release control halo object. The skill releasable range specified by the skill indicator object completely covers the area in which the skill-release control halo object is located.

Step 25: When detecting a drag operation on the virtual joystick object, controlling a skill-release location of the skill object to be correspondingly adjusted on the graphical user interface.

Step 26: Determine whether the virtual joystick object is out of a threshold range and, when the virtual joystick object is not out of the threshold range, according to a detected release operation of the drag operation, selecting a target character object satisfying a first preset policy from at least one character object within a skill releasable range of the skill object, and performing a skill-release operation on the target character object.

Step 27: Synchronizing an execution result obtained by performing step 24 to step 26 to the server, or instantly transferring the execution result to the terminal 1 by using the server, or directly forward the execution result to the terminal 1, so that the user 1 that logs in to the game system by using the terminal 1 can respond to the virtual operation of the user 2, so as to implement interaction between multiple terminals. In this application scenario, only interaction between two terminals is used as an example, and during an actual operation, interaction between multiple terminals may be not limited to interaction between the two terminals in this example.

Step 30: Optionally, after receiving a first man-machine interaction execution result obtained by step 14 to step 17 and/or a second interaction execution result obtained by step 24 to step 27, synchronizing or transferring the first man-machine interaction execution result and/or the second interaction execution result to corresponding terminals.

In the embodiments provided in this application, it should be understood that the disclosed devices and methods may be implemented in other manners. The described device embodiments are merely examples. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between constituent parts may be implemented through some interfaces. The indirect couplings or communication connections between the devices or units may be implemented in electronic, mechanic, or other forms.

The units described as separate parts may or may not be physically separate, and parts displayed as units may or may not be physical units, may be located in one location, or may be distributed on multiple network units. Some or all of the units may be selected according to actual needs to achieve the objectives of the solutions of the embodiments.

In addition, the functional units in the embodiments of the present invention may all be integrated into one processing unit, or each of the units may exist separately, or two or more units are integrated into one unit, and the integrated unit may be implemented in a form of hardware, or may be implemented in a form of hardware in addition to a software functional unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a portable storage device, a read-only memory (ROM), a random access memory (RAM), a magnetic disk, or an optical disc.

Alternatively, when the integrated unit is implemented in a form of a software functional module and sold or used as an independent product, the integrated unit may be stored in a computer-readable storage medium. Based on such an understanding, the technical solutions of the embodiments of the present invention essentially, or the part contributing to the existing technology may be implemented in a form of a software product. The computer software product is stored in a storage medium, and includes several instructions for instructing a computer device (which may be a personal computer, a server, or a network device) to perform all or some of the steps of the methods described in the embodiments of the present invention.

The foregoing storage medium includes: any medium that can store program code, such as a portable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

According to the embodiments of the present invention, a target character object is selected and located by determining whether a virtual joystick object touched by a user finger is out of a threshold range. When it is determined that the virtual joystick object touched by the user finger is not out of the threshold range, a finger release gesture of the user is obtained; and a character object satisfying a first preset policy is selected from at least one character object within a skill releasable range as the target character object having the highest priority. A skill-release operation is then performed on the target character object. In such a way of releasing the specific skill, the target object for the skill-release can be located accurately and rapidly, avoiding mis-operation and improving interaction processing speed due to the improved locating accuracy.

What is claimed is:

1. An information processing method implemented by a computer system, comprising:
   performing rendering on a graphical user interface to obtain at least one virtual resource object;
   when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object;
   when detecting a dragging operation on the virtual joystick object, controlling a skill-release location of the skill object to be correspondingly adjusted on the graphical user interface;
   determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object;
   when it is determined that the virtual joystick object touched by a user finger is not out of the threshold range, obtaining a user finger release gesture; and
   when no target character object is found within the skill releasable range, discarding the skill-release operation on the target character object within the skill releasable range, and displaying a first prompt message, wherein the first prompt message is used to represent that there is no selectable target character object within the skill releasable range.

2. The method according to claim 1, further comprising:
   when it is determined that the virtual joystick object touched by a user finger is out of the threshold range, performing rendering on the graphical user interface to obtain a supplementary skill indicator object, wherein a skill releasable range specified by the supplementary skill indicator object is a searching range of a first character object;

after obtaining a user finger release gesture, selecting, from at least one first character object within the searching range, a first character object satisfying a second preset policy as the target character object; and
performing the skill-release operation on the target character object within the searching range.

3. The method according to claim 2, further comprising:
in a first relative direction formed by the virtual joystick object relative to a center of the skill-release control halo object, generating a first target selection direction line by using a connection line to a center point of the skill indicator object; and
centering around the first target selection direction line, forming the supplementary skill indicator object based on a positive offset and a negative offset on a preset angle.

4. The method according to claim 3, wherein the selecting, from at least one first character object within the searching range, a first character object satisfying a second preset policy as the target character object comprises:
when there are multiple first character objects within the searching range, selecting a first character object with a shortest vertical distance to the first target selection direction line as the target character object, and highlighting the target character object.

5. The method according to claim 4, further comprising:
each time it is detected that a location of the virtual joystick object changes relative to the center of the skill-release control halo object, changing the first relative direction to a second relative direction;
in the second relative direction, generating a second target selection direction line by using a connection line to the center point of the skill indicator object; and
selecting a second character object with a shortest vertical distance to the second target selection direction line as the target character object, and highlighting the target character object.

6. The method according to claim 1, further comprising:
when it is determined that the virtual joystick object touched by a user finger is out of the threshold range, performing rendering on the graphical user interface to obtain a supplementary skill indicator object, wherein the supplementary skill indicator object specifies a skill releasable range as a searching range of a first character object; and
after obtaining a user finger release gesture, when no first character object is found within the searching range, discarding the skill-release operation on the target character object within the searching range, and displaying a second prompt message, wherein the second prompt message is used to represent that there is no selectable target character object within the searching range.

7. A terminal, comprising:
a display;
a memory storing instructions; and
a processor coupled to the memory and the display and, when executing the instructions, configured for:
performing rendering on a graphical user interface of the display to obtain at least one virtual resource object;
when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object;
when detecting a dragging operation on the virtual joystick object, controlling a skill-release location of the skill object to be correspondingly adjusted on the graphical user interface;
determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object;
when it is determined that the virtual joystick object touched by a user finger is not out of the threshold range, obtaining a user finger release gesture; and
when no target character object is found within the skill releasable range, discarding the skill-release operation on the target character object within the skill releasable range, and displaying a first prompt message on the display, wherein the first prompt message is used to represent that there is no selectable target character object within the skill releasable range.

8. The terminal according to claim 7, wherein the processor is further configured for:
when it is determined that the virtual joystick object touched by a user finger is out of the threshold range, performing rendering on the graphical user interface to obtain a supplementary skill indicator object, wherein a skill releasable range specified by the supplementary skill indicator object is a searching range of a first character object;
after obtaining a user finger release gesture, selecting, from at least one first character object within the searching range, a first character object satisfying a second preset policy as the target character object; and
performing the skill-release operation on the target character object within the searching range.

9. The terminal according to claim 8, wherein the processor is further configured for:
in a first relative direction formed by the virtual joystick object relative to a center of the skill-release control halo object, generating a first target selection direction line by using a connection line to a center point of the skill indicator object; and
centering around the first target selection direction line, forming the supplementary skill indicator object based on a positive offset and a negative offset on a preset angle.

10. The terminal according to claim 9, wherein the selecting, from at least one first character object within the searching range, a first character object satisfying a second preset policy as the target character object comprises:
when there are multiple first character objects within the searching range, selecting a first character object with a shortest vertical distance to the first target selection direction line as the target character object, and highlighting the target character object.

11. The terminal according to claim 10, wherein the processor is further configured for:
each time it is detected that a location of the virtual joystick object changes relative to the center of the skill-release control halo object, changing the first relative direction to a second relative direction;

in the second relative direction, generating a second target selection direction line by using a connection line to the center point of the skill indicator object; and selecting a second character object with a shortest vertical distance to the second target selection direction line as the target character object, and highlighting the target character object.

12. The terminal according to claim 7, wherein the processor is further configured for:

when it is determined that the virtual joystick object touched by a user finger is out of the threshold range, performing rendering on the graphical user interface to obtain a supplementary skill indicator object, wherein the supplementary skill indicator object specifies a skill releasable range as a searching range of a first character object; and after obtaining a user finger release gesture, when no first character object is found within the searching range, discarding the skill-release operation on the target character object within the searching range, and displaying a second prompt message on the display, wherein the second prompt message is used to represent that there is no selectable target character object within the searching range.

13. A non-transitory computer-readable storage medium containing computer-executable instructions for, when executed by a processor, performing an information processing method, the method comprising:

performing rendering on a graphical user interface to obtain at least one virtual resource object;

when detecting a skill-release trigger gesture on at least one skill object located in at least one skill operation area on the graphical user interface, performing rendering on the graphical user interface to obtain a skill-release supplementary control object, the skill-release supplementary control object comprising a skill-release control halo object and a virtual joystick object located within a radiation range of the skill-release control halo object;

when detecting a dragging operation on the virtual joystick object, controlling a skill-release location of the skill object to be correspondingly adjusted on the graphical user interface;

determining whether the virtual joystick object is out of a threshold range and, when the virtual joystick object is not out of the threshold range, selecting a target character object satisfying a first preset policy from at least one character object within a skill releasable range of the skill object according to a detected release operation of the dragging operation, and performing a skill-release operation on the target character object;

when it is determined that the virtual joystick object touched by a user finger is not out of the threshold range, obtaining a user finger release gesture; and when no target character object is found within the skill releasable range, discarding the skill-release operation on the target character object within the skill releasable range, and displaying a first prompt message, wherein the first prompt message is used to represent that there is no selectable target character object within the skill releasable range.

14. The non-transitory computer-readable storage medium according to claim 13, the method further comprising:

when it is determined that the virtual joystick object touched by a user finger is out of the threshold range, performing rendering on the graphical user interface to obtain a supplementary skill indicator object, wherein a skill releasable range specified by the supplementary skill indicator object is a searching range of a first character object;

after obtaining a user finger release gesture, selecting, from at least one first character object within the searching range, a first character object satisfying a second preset policy as the target character object; and performing the skill-release operation on the target character object within the searching range.

15. The non-transitory computer-readable storage medium according to claim 14, the method further comprising:

in a first relative direction formed by the virtual joystick object relative to a center of the skill-release control halo object, generating a first target selection direction line by using a connection line to a center point of the skill indicator object; and centering around the first target selection direction line, forming the supplementary skill indicator object based on a positive offset and a negative offset on a preset angle.

16. The non-transitory computer-readable storage medium according to claim 15, wherein the selecting, from at least one first character object within the searching range, a first character object satisfying a second preset policy as the target character object comprises:

when there are multiple first character objects within the searching range, selecting a first character object with a shortest vertical distance to the first target selection direction line as the target character object, and highlighting the target character object.

17. The non-transitory computer-readable storage medium according to claim 16, the method further comprising:

each time it is detected that a location of the virtual joystick object changes relative to the center of the skill-release control halo object, changing the first relative direction to a second relative direction;

in the second relative direction, generating a second target selection direction line by using a connection line to the center point of the skill indicator object; and selecting a second character object with a shortest vertical distance to the second target selection direction line as the target character object, and highlighting the target character object.

* * * * *